March 24, 1964 G. CONSTANTINE, JR 3,126,528

MAGNETIC SWITCHING DEVICES

Filed June 30, 1958 2 Sheets-Sheet 1

INVENTOR
GREGORY CONSTANTINE, JR.
BY Edwin Lester
ATTORNEY

March 24, 1964 G. CONSTANTINE, JR 3,126,528

MAGNETIC SWITCHING DEVICES

Filed June 30, 1958 2 Sheets-Sheet 2

United States Patent Office 3,126,528

Patented Mar. 24, 1964

3,126,528

MAGNETIC SWITCHING DEVICES

Gregory Constantine, Jr., Poughkeepsie, N.Y., assignor to International Business Machines Corporation, New York, N.Y., a corporation of New York Filed June 30, 1958, Ser. No. 745,395
7 Claims. (Cl. 340—174)

This invention relates to switching devices and more particularly to improved magnetic switches.

Data processing machines employ a memory which may be of magnetic core type comprising a group of memory planes each consisting of a plurality of magnetic cores arranged in a matrix of columns and rows. Generally, each plane is provided with separate row windings each inductively coupling a row of cores and separate column windings each inductively coupling a column of cores. The corresponding row windings and the corresponding column windings are respectively connected serially so that a selected row and column winding intersect a group of cores occupying corresponding positions in the memory planes. Excitation of both a selected row and column winding causes the cores at the intersections of these windings to have their magnetic condition changed. Thus, a group of memory cores, corresponding to the bits of a data word, may be selected by applying a drive pulse coincidently to be selected row and column winding. Each plane is also provided with a sense winding inductively coupled to all of the cores in the plane to sense the change in magnetic condition of the selected core in the plane.

Selection of a row winding and column winding may be accomplished by a magnetic switch. One type of magnetic switch is the load sharing type which consists of a plurality of magnetic cores having a plurality of windings inductively coupled thereto in accordance with a predetermined combinatorial code. Each core has an output winding connected to a row or column winding of the memory. Drive means are provided for applying drive pulses coincidently to selected ones of the windings so that a desired one of the cores has its magnetic condition changed inducing a signal in its output winding which is used to drive a selected row or column winding of the memory. This arrangement permits the power from several sources to be combined into a single high powered output signal. Consequently, each source need only furnish a fraction of the power required by the load.

Another type of magnetic switch is the matrix type which consists of a plurality of magnetic cores arranged in columns and rows having separate row windings each inductively coupling a row of cores and separate column windings each inductively coupling a column of cores. Again, each core has an output winding connected to a row or column winding of the memory. Drive means are provided for applying drive pulses coincidently to a selected one of the row and column windings so that a desired one of the cores has its magnetic condition changed inducing a signal in its output winding which is used to drive a selected row or column winding of the memory. This arrangement provides a minimum of load sharing but has a greater number of outputs per driver than the first type of switch. Thus, an 8×8 matrix switch provides 64 outputs, a 16×16 matrix switch provides 256 outputs etc.

One of the major problems encountered in magnetic switches is that of unwanted signals, termed noise, generated in the unselected cores when the selected core is being driven. Thus, in the first type of magnetic switch, where the windings pass through all of the cores in a predetermined combinatorial code, the magnetic effect due to the drive currents passing through an unselected core in the same sense is partially cancelled by the magnetic effect due to the drive currents passing through the unselected core in the opposite sense. However, the net magnetic effect causes the unselected core to be driven a small amount thereby inducing a small undesirable noise signal in the output winding thereof. This spurious output is applied to an unselected winding of the memory and may start to switch an unselected group of memory cores tending to destroy their stored information or produce incorrect outputs from the memory. Furthermore, the drivers must furnish the additional power which goes into these spurious signals and does no useful work.

Accordingly, an object of the present invention is to provide a new and improved magnetic switch.

Another object of the invention is to provide a novel magnetic switch which eliminates spurious outputs.

Still another object of the invention is to provide an improved load sharing magnetic switch.

A further object of the invention is to provide a novel load sharing magnetic switch which avoids spurious outputs.

Still another object of the invention is to provide a novel magnetic switch which is expandable without the introduction of spurious outputs.

A still further object of the invention is to provide an improved magnetic matrix switch.

Another object of the invention is to provide a novel load sharing magnetic matrix switch which reduces the required driver power.

In accordance with the present invention a magnetic switch is provided comprising a plurality of magnetic cores having a plurality of windings inductively coupled to each core in a different manner. Driver means are provided to apply driver current coincidently to selected ones of the windings for selecting one of the cores in accordance with a predetermined combinatorial code. The selected windings are wound on the selected core in such a manner that the magnetic effect thereon due to the currents in the selected windings is additive to produce excitation of the selected core while the selected windings are wound on the remaining unselected cores in such a manner that the magnetic effect on the remaining unselected cores due to the currents in the selected windings is cancelled to produce no excitation of the remaining unselected cores.

Other objects of the invention will be pointed out in the following description and claims and illustrated in the accompanying drawings, which disclose, by way of example, the principle of the invention and the best mode, which has been contemplated, of applying that principle.

Figures 1, 2:
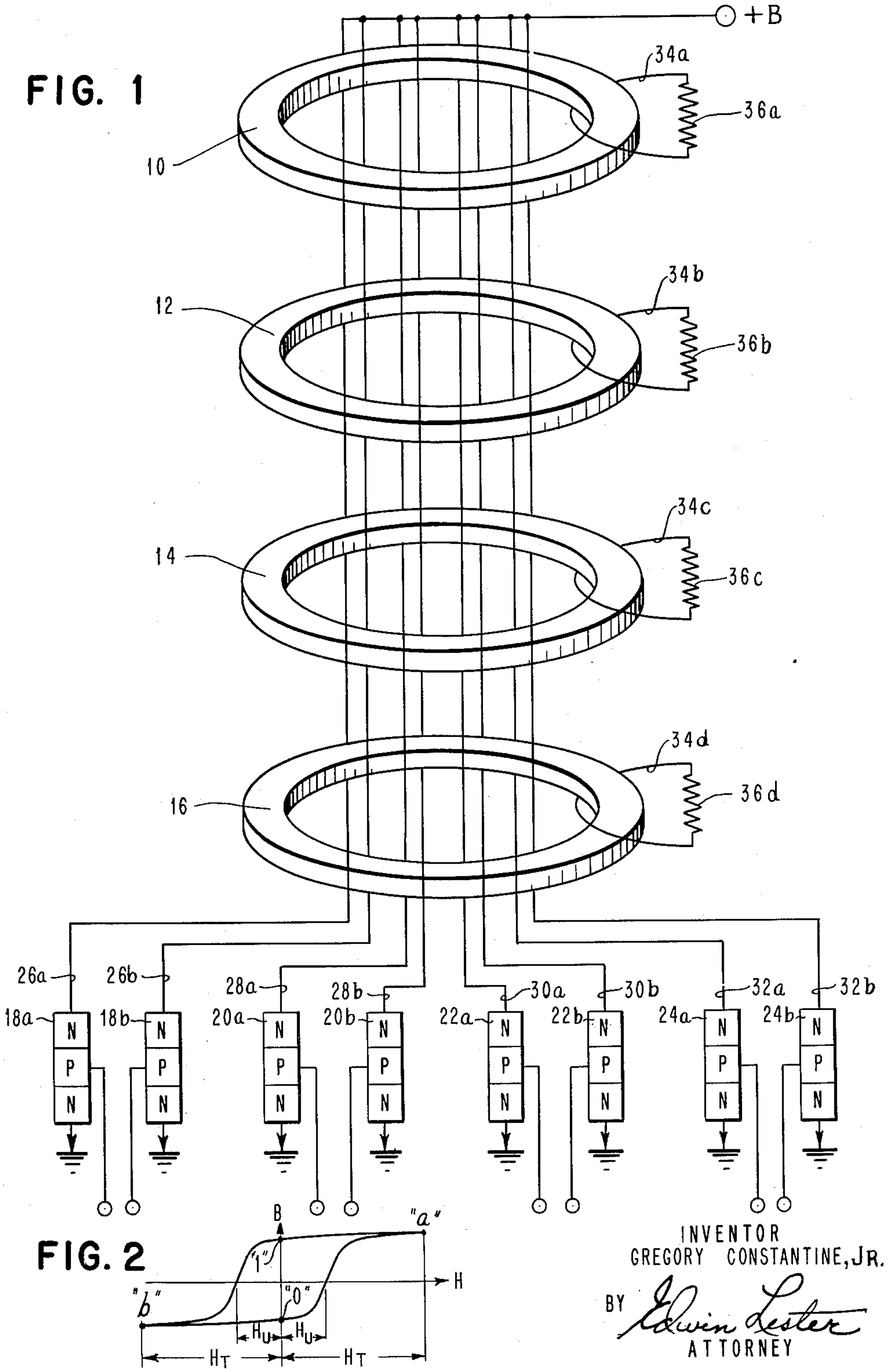
FIG. 1 is a schematic drawing of a magnetic switch embodying the present invention.
FIG. 2 is a hysteresis curve which is illustrated as an aid in understanding the embodiment in FIG. 1.

Referring now to FIG. 1, there is shown a schematic diagram of one embodiment of the present invention. It comprises a magnetic switch which includes four magnetic cores 10, 12, 14 and 16 which may be toroidal in shape, though other suitable shapes may be used. Four pairs of input windings 26, 28, 30 and 32 are serially wound, in a different pattern, through the four cores 10, 12, 14 and 16 to a source +B with the windings of each pair passing in opposite sense through each core. Each core has an input winding 34 which is connected to a row or column winding of the memory represented by the resistor load 36. Four pairs of NPN transistor drivers 18, 20, 22 and 24 are respectively connected to the four pairs of input windings 26, 28, 30 and 32. Though NPN drivers are shown, it will be understood that other suitable drivers can be used equally as well without departing from the scope of the present invention. When a positive signal is applied to the base of the NPN transistor driver, it is rendered conductive to apply a drive current pulse to the associated winding passing through all of the cores.

Referring now to FIG. 2, there is shown a typical hysteresis loop for a magnetic core. Magnetic cores possess two stable or remanent states of magnetism which are opposite in sense and, consequently, a magnetic core may operate as a binary element with one remanent state representing the binary digit 1 and the opposite remanent state representing the binary digit 0. The application of a drive current pulse to a wire passing through a magnetic core causes the core to follow the hysteresis loop as a function of the direction and magnitude of the current. The value of the magnitude of current necessary to generate a magnetomotive force sufficient ot change the state of the core may be referred to as the threshold value. If the magnitude of the applied drive current pulse has a value which is less than the threshold value, then the core experiences some magnetic excursion on the hysteresis loop but when the current is removed the core will return to essentially the same remanent state at which it started. On the other hand, if the magnitude of the drive current pulse has a value which is greater than the threshold value and the current is applied in the proper direction, then the core changes from one remanent state to the other.

Considering unipolar drive current pulses, the sense of a winding may be defined as the direction in which it passes through the core. Accordingly, a winding in the "1" sense may arbitrarily be designated as passing over and under a core so that a unipolar drive current pulse applied thereto causes a magnetomotive force to be generated which tends to drive the core towards magnetic saturation in the 1 state. A winding in the "0" sense may be designated as passing under and over a core so that a unipolar drive current pulse applied thereto causes a magnetomotive force to be generated which tends to drive the core towards magnetic saturation in the 0 state. Thus, considering a core in the 0 state and a winding passing therethrough in the "1" sense, then, if a unipolar drive current pulse is applied to the winding, the magnitule of which has a value greater than the threshold value, the core follows the hysteresis loop to the saturation point *a* and when the drive current pulse is terminated the core comes to rest in the 1 state. Likewise, considering the core in the 1 state and a winding passing therethrough in the "0" sense, then, if a unipolar drive current pulse is applied to the winding, the magnitude of which has a value greater than the threshold value, the core follows the hysteresis loop to the saturation point *b* and when the drive current pulse is terminated the core comes to rest in the 0 state. The change in flux, when the core switches from the 0 state to the 1 state, induces an output pulse in the output winding of the core which may be used as a read drive pulse for a selected column or row winding of memory. Likewise, the change in flux, when the core switches from the 1 state to the 0 state, induces an output pulse in the output winding of the core equal in magnitude but opposite in sense to that of the output pulse produced when the core switches from the 0 state to the 1 state and may be used as a write drive pulse for the selected column or row winding of memory.

The principle of load sharing is to combine the magnetomotive forces generated by the currents from several drivers to that the combined magnetomotive force has a value equal to that generated by the current which would otherwise be applied from a single driver. Consequently, each driver need only furnish a fraction of the current required to change the state of the magnetic core.

Thus, the unit of current provided by each driver generates a unit magnetomotive force $H_U$ which is equal to $$\frac{H_T}{N}$$

where $H_T$ is the total magnetomotive force required to drive the core and N is the number of drivers applying drive currents to the core. In applying the principle of load sharing, N pairs of windings are inductively coupled to a core with one winding of each pair passing through the core in the "1" sense and the other winding of each pair passing through the core in the "0" sense. Consequently, N windings pass through the core in the "1" sense and N windings pass through the core in the "0" sense. Hence, during read time of a memory cycle, by applying drive current pulses coincidently to the N windings in the "1" sense, N units of magnetomotive force are combined to drive a core, which is in the 0 state, to the 1 state. The change in flux, when the core switches from the 0 state to the 1 state, induces an output pulse in the output winding of the core which may be used as a read drive pulse for a selected column or row winding of memory. Likewise, during write time of a memory cycle, by applying drive current pulses coincidently to the N windings in the "0" sense, N units of magnetomotive force are combined to drive the core, which is in the 1 state, to the 0 state. The change in flux, when the core switches from the 1 state to the 0 state, induces an output pulse in the output winding of the core equal in magnitude but opposite in sense to that of the first mentioned output pulse which may be used as a write drive pulse for the selected column or row winding of memory.

Referring to FIG. 1, the present invention contemplates a load sharing magnetic switch consisting of a plurality M of cores having N pairs of windings inductively coupled thereto with a different winding pattern for each core so that a single core may be uniquely selected without generating spurious outputs from any of the remaining unselected cores. To accomplish this result, a particular winding pattern must be developed. Thus, the basic pattern is shown in Table I below.

*Table I*

| II | I |
|---|---|
| 1 | 1 |
| III | IV |
| 1 | 0 |

where a row represents a single core and a column represents a complementary pair of windings. A convention may be adopted whereby a 1 represents the complementary pair of windings passing through the core in a 1–0 sense and a 0 represents the complementary pair of windings passing through the core in a 0–1 sense. The basic pattern may be expanded most conveniently by doubling the size each time and repeating the previous pattern in quadrants I, II and III and complementing the pattern in quadrant IV. Consequently, the basic pattern may be expanded for a four output magnetic switch to the following pattern shown in Table II below

*Table II*

| | | | |
|---|---|---|---|
| 1 | 1 | 1 | 1 |
| 1 | 0 | 1 | 0 |
| 1 | 1 | 0 | 0 |
| 1 | 0 | 0 | 1 |

and further expansions may be accomplished in a similar manner to provide the winding patterns for an 8 output magnetic switch, a 16 output magnetic switch etc.

Following this expansion, the winding pattern for the four output magnetic switch of FIG. 1 is shown in Table III below:

*Table III*

| Core No. | Winding Pattern | Winding Sense | | | | | | | |
|---|---|---|---|---|---|---|---|---|---|
| | | 26a | 26b | 28a | 28b | 30a | 30b | 32a | 32b |
| 10 | 1 1 1 1 | 1 | 0 | 1 | 0 | 1 | 0 | 1 | 0 |
| 12 | 1 0 1 0 | 1 | 0 | 0 | 1 | 1 | 0 | 0 | 1 |
| 14 | 1 1 0 0 | 1 | 0 | 1 | 0 | 0 | 1 | 0 | 1 |
| 16 | 1 0 0 1 | 1 | 0 | 0 | 1 | 0 | 1 | 1 | 0 |

In the operation of the magnetic switch, selection of a core to be driven from the zero state to the one state is accomplished by exciting in each of the selecting pairs of windings the windings which pass through that core in the "1" sense in accordance with the read selection pattern. Likewise, selection of a core to be driven from the one state to the zero state is accomplished by exciting in each of the selecting pairs of windings the windings which pass through that core in the "0" sense in accordance with the write selection pattern.

Thus, assume that all of the cores 10, 12, 14 and 16 are in the 0 state and that it is desired to select core 12, corresponding to the pattern 1 0 1 0, to be changed to the 1 state. Consequently, positive signals are applied coincidently to the bases of the transistor drivers 18*a*, 20*b*, 22*a* and 24*b* causing them to conduct and apply drive current pulses via windings 26*a*, 28*b*, 30*a* and 32*b* respectively. Referring to Table III it will be noted that core 12 is the only core receiving four units of magnetomotive force in the "1" sense. Consequently, core 12 will be driven from the 0 state to the 1 state inducing an output pulse in the output winding 34*b* to drive the load 36*b*. With respect to memory, this output pulse corresponds to a row read driver pulse which together with a column read driver pulse, generated in a similar manner, selects a group of cores in memory from which a data word is to be read.

Referring again to Table III, it will be noted that when drive current pulses are applied to windings 26*a*, 28*b*, 30*a* and 32*b* to select core 12, cores 10, 14 and 16 receive two units of magnetomotive force in the 1 sense and two units of magnetomotive force in the 0 sense which cancel each other so that no spurious output pulses are applied to any of the output windings 34*a*, 34*c* and 34*d*. In a similar manner, any of the remaining cores 10, 14 and 16 may be selected by applying drive current pulses to the proper windings so that the combined magnetomotive force drives the selected core from the 0 state to the 1 state while the remaining unselected magnetic cores receive zero excitation resulting in no spurious outputs being generated in the output windings of the unselected cores.

When a new data word is to be written or the previously read out data word is to be rewritten into the selected group of cores in memory, a row and column write driver pulse must be generated which is equal in magnitude but opposite in polarity to that of the read driver pulse previously generated. This is accomplished by restoring the previously selected core of the magnetic switch from the 1 state to the 0 state. Thus, positive signals are applied coincidently to the bases of the transistor drivers 18*b*, 20*a*, 22*b* and 24*a* causing them to conduct and apply drive current pulses via windings 26*b*, 28*a*, 30*b* and 32*a* respectively. Referring to Table III, it will be noted that the previously selected core 12, corresponding to the pattern 1 0 1 0, is the only core now receiving four units of magnetomotive force in the 0 sense. Consequently, core 12 will be driven from the 1 state to the 0 state inducing an output pulse in the output winding 34*b* which is equal in magnitude but opposite in polarity to the output pulse previously produced when the core was switched from the 0 state to the 1 state. In a similar manner, any of the remaining cores 10, 14 and 16 may be selected by applying drive current pulses to the proper windings so that the combined magnetomotive force drives the selected core from the 1 state to the 0 state while the remaining unselected magnetic cores receive zero excitation resulting in no spurious outputs being generated in the output windings of the unselected cores.

In view of the result that is obtained with this type of magnetic switch, the choice of input voltage and current supplied through the selected core, the number of turns on the input and output windings, and the core dimensions and material are a matter of transformer design and are not of major concern here. Whether linear or square loop core material is used in a particular application does not effect the ability of the input windings to excite only one core. Thus, it should be apparent, that the magnetic switch of the present invention combines the principle of load sharing with the elimination of spurious outputs. As a result, the switch economizes on the amount of power required from each driver since the additional power which would normally go into the spurious outputs is not required.

Figure 3:
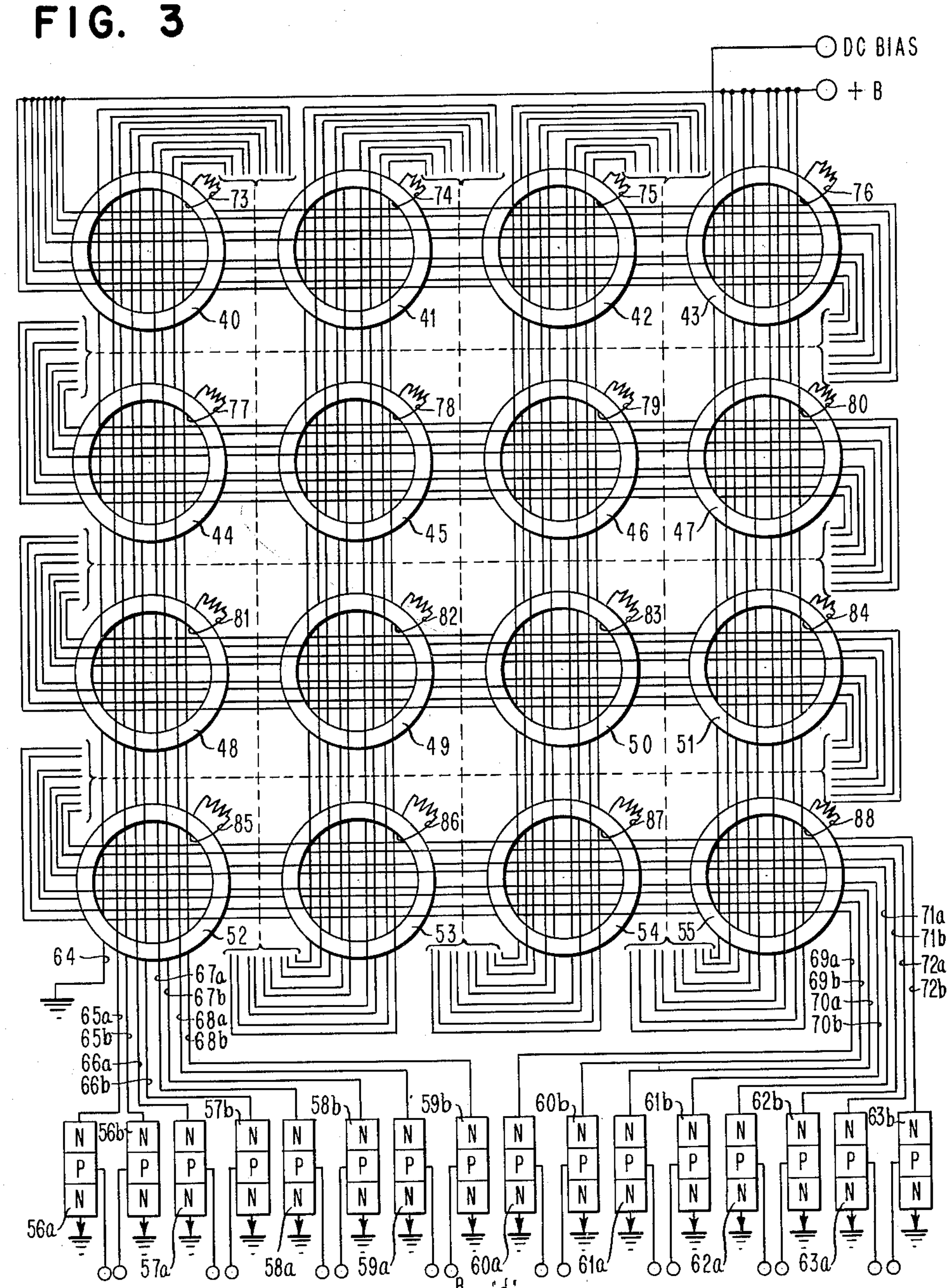
FIG. 3 is a schematic drawing of another embodiment of the present invention.

Referring now to FIG. 3, there is shown a schematic diagram of another embodiment of the present invention. It comprises a magnetic switch which, by way of example, includes sixteen cores 40 to 55, inclusive, arranged in a matrix of rows and columns. Each core may be made of a square loop magnetic material and is preferably toroidal in shape though other shapes may be used. A bias wire 64 is inductively coupled serially through all of the cores in the matrix to a D.C. source and is used to bias all of the cores in a manner which will be explained hereinafter. Four pairs of input windings 65, 66, 67 and 68 are serially wound through the columns of cores to a source +B. The windings are wound through the cores in each column in the same pattern but the pattern is different for each column. Similarly, four pairs of input windings 69, 70, 71 and 72 are serially wound through the rows of cores to the source +B. The windings are wound through the cores in each row in the same pattern but the pattern is different for each row The windings of each pair passing through a row and column of cores pass in the opposite sense through each core. Each of the sixteen cores 40 to 55, inclusive, has a corresponding output winding 73 to 88, inclusive, which is connected to a respective row or column winding of the memory represented by the resistor loads. Four pairs of NPN transistor drivers 56, 57, 58 and 59 are respectively connected to the four pairs of column input windings 65, 66, 67 and 68. Likewise, four pairs of NPN transistor drivers 60, 61, 62 and 63 are respectively connected to the four pairs of row input windings 69, 70, 71 and 72.

Figure 4:
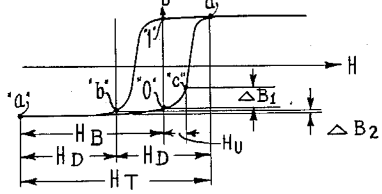
FIG. 4 is a hysteresis curve which is shown to assist in explaining the operation of the embodiment in FIG. 3.

Referring now to FIG. 4, there is shown a typical hysteresis loop for a magnetic core of square loop material. Heretofore, magnetic matrix switches have been provided with separate row windings each inductively coupling a row of cores and separate column windings each inductively coupling a column of cores. The cores of the switch are initially set to the 0 state and a particular core is selected by applying drive current pulses coincidently to the column winding and row winding which are coupled to that particular core. The amplitude of the drive current pulse is chosen so that a column winding alone or a row winding alone provides an insufficient unit of magnetomotive force $H_U$ to drive the core from the 0 state to the 1 state as shown on the hysteresis curve. However, the combined magnetomotive force generated by the column and row drive current pulses coincidently is sufficient to drive the selected core from the 0 state to the 1 state. The selected core can be reset to the 0 state by reversing the current through the two selecting windings or by providing a restore winding wound through all of the cores.

When drive current pulses are applied to a selected row and column winding, the unselected cores on the selected row and column windings each receive a unit of excitation which, though it does not cause them to change their state, causes these unselected cores to experience a magnetic excursion along the hysteresis loop from point 0 to point *c*. The magnetic excursion causes a change in flux $\Delta B_1$ which induces spurious outputs in the unselected cores. These spurious outputs can be minimized by the use of a bias winding passing through all of the cores and having direct current applied thereto to generate a magnetomotive force which is equal to or greater than a unit of magnetomotive force applied to a selected core by the drive current pulse applied to a single row or column winding. Thus, assume a biasing magnetomotive force, $H_B$, the cores of the switch are initially positioned at point *a* on the hysteresis curve. The selected column and row winding each provides a magnetomotive force equal to $H_D$ which is half the total magnetomotive force $H_T$ required. Hence, when the drive current pulses are applied to the selected column and row windings, the unselected cores on the selected column and row windings are driven from point *a* to point *b* on the hysteresis loop and each unselected core experiences a change in flux $\Delta B_2$ which is less than the change in flux which occurred when the unlselected cores were driven from point 0 to point *c*. Consequently, the spurious outputs produced by the unselected cores will be negligible by comparison.

It will be noted that when a matrix type of magnetic switch, which does not include a bias wire, is used, the unit of magnetomotive force $H_U$ generated by a column or row drive current pulse is much less than the unit of magnetomotive force $H_D$ that is generated by a column or row drive current pulse when a matrix type of magnetic switch which includes a bias wire is used. Consequently, the amplitude of the drive current pulse must be made much larger in order to overcome the bias and cause the core to change its state of magnetism. To minimize this requirement, the present invention contemplates applying the principle of load sharing to a matrix type of magnetic switch without introducing any additional spurious outputs. Thus, the power which is normally required from a single driver may be shared by a group of smaller drivers without introducing any additional spurious outputs than is produced by the conventional matrix type of magnetic switch. Hence, each transistor driver need only furnish a fraction of the total power which must be delivered to the load.

This advantage is obtained by wiring the columns and rows of the matrix magnetic switch shown in FIG. 3 in accordance with Table III. Thus, the column windings 65, 66, 67 and 68 are wound identically through each of the cores 40, 44, 48 and 52 corresponding to the pattern 1 1 1 1. The column windings 65, 66, 67 and 68 are then wound identically through each of the cores 41, 45, 49 and 53 corresponding to the pattern 1 0 1 0. Next, the column windings 65, 66, 67 and 68 are wound identically through each of the cores 42, 46, 50 and 54 corresponding to the pattern 1 1 0 0. Finally, the column windings 65, 66, 67 and 68 are wound identically through each of the cores 43, 47, 51 and 55 corresponding to the pattern 1 0 1 0. Similarly, the row windings 69, 70, 71 and 72 are wound identically through each of the cores 52, 53, 54 and 55 corresponding to the pattern 1 1 1 1. The row windings 69, 70, 71 and 72 are then wound identically through each of the cores 48, 49, 50 and 51 corresponding to the pattern 1 0 1 0. Next, the row windings 69, 70, 71 and 72 are wound identically through each of the cores 44, 45, 46 and 47 corresponding to the pattern 1 1 0 0. Finally, the row windings 69, 70, 71 and 72 are wound identically through each of the cores 40, 41, 42 and 43 corresponding to the pattern 1 0 1 0.

In the operation of the magnetic matrix switch, selection of a core to be driven from the 0 state to the 1 state is accomplished by coincidently exciting in each of the column and row selecting pairs of windings the windings which pass through the selected core in the "1" sense in accordance with the read selection pattern. Likewise, selection of a core to be driven from the 1 state to the 0 state is accomplished by coincidently exciting in each of the column and row selecting pairs of windings the windings which pass through the selected core in the "0" sense in accordance with the write selection pattern.

This, assuming that all of the cores 40 to 55, inclusive, are in the 0 state and that it is desired to select core 45, corresponding to the column pattern 1 0 1 0 and the row pattern 1 1 0 0, to be changed to the 1 state. Consequently, positive signals are applied coincidently to the bases of the transistor drivers 56*a*, 57*b*, 58*a*, 59*b*, 60*a*, 61*a*, 62*b* and 63*b* causing them to conduct and apply drive current pulses to the column windings 65*a*, 66*b*, 67*a* and 68*b* and row windings 69*a*, 70*a*, 71*b* and 72*b* respectively. Considering first the drive current pulses on the column windings 65*a*, 66*b*, 67*a* and 68*b*, cores 40, 44, 48 and 52 each wound in accordance with the pattern 1 1 1 1 receive two units of magnetomotive force in the "1" sense and two units of magnetomotive force in the "0" sense which cancel each other so that no spurious output pulses are produced in any of the output windings 73, 77, 81 and 85. Cores 41, 45, 49 and 53, each wound in accordance with the selected pattern 1 0 1 0, receive four units of magnetomotive force in the 1 sense and consequently drives these cores from point *a* to point *b* on the hysteresis loop so that cores 41, 49 and 53 experience a change of flux $\Delta B_2$ which causes negligible spurious outputs to be produced in the output windings 74, 82 and 86. Cores 42, 46, 50 and 54, each wound in accordance with the pattern 1 1 0 0, receive two units of magnetomotive force in the "1" sense and two units of magnetomotive force in the "0" sense which cancel each other so that no spurious output pulses are produced in any of the output windings 75, 79, 83 and 87. Cores 43, 47, 51 and 55, each wound in accordance with the pattern 1 0 0 1, receive two units of magnetomotive force in the "1" sense and two units of magnetomotive force in the "0" sense which cancel each other so that no spurious output pulses are produced in any of the output windings 76, 80, 84 and 88. It should be noted that, considering only the column drive current pulses, the row of cores including the selected core 45 corresponds to the four core magnetic switch of FIG. 1 in that the magnetic effect, due to the drive current pulses in the selected windings, produce excitation of a selected core whereas the magnetic effect in the unselected cores is cancelled to produce no excitation therein.

Considering now the drive current pulses in the row windings 69*a*, 70*a*, 71*b* and 72*b*, cores 52, 53, 54 and 55, each wound in accordance with the pattern 1 1 1 1, received two units of magnetomotive force in the "1" sense and two units of magnetomotive force in the "0" sense which cancel each other so that no spurious output pulses are produced in any of the output windingss 85, 86, 87 and 88. Cores 48, 50 and 51, each wound in accordance with the pattern 1 0 1 0, received two units of magnetomotive force in the "1" sense and two units of magnetomotive force in the "0" sense which cancel each other so that no spurious output pulses are produced in any of the output windings 81, 82, 83 and 84. Cores 44, 45, 46 and 47, each wound in accordance with the selected pattern 1 1 0 0, receive four units of magnetomotive force in the "1" sense tending to drive the cores from point *a* to point *b* on the hysteresis loop so that the unselected cores 44, 46 and 47 experience a change in flux $\Delta B_2$, which produces relatively negligible spurious outputs in the output windings 77, 79 and 80. The four units of magnetomotive force in the "1" sense, due to the row drive current pulses, added to the four units of magnetomotive in the 1 sense, due due to the column drive current pulses, change the selected core 45 from the 0 state to the 1 state inducing an output pulse in the output winding 78 which is used as a read drive for a selected winding of the memory. Cores 40, 41, 42 and 43, each wound in accordance with the pattern 1 0 0 1, receive two units of magnetomotive force in the "1" sense and two units of magnetomotive force in the "0" sense which cancel each other so that no spurious output pulses are produced in any of the output windings 73, 74, 75 and 76. In a similar manner, any of the remaining cores of the magnetic matrix switch may be selected by applying drive current pulses to the proper column and row windings so that the combined magnetomotive force drives the selected core from the 0 state to the 1 state. The unselected magnetic cores on the selected row and column receive negligible excitation while the remaining unselected cores receive zero excitation.

To more rapidly restore the previously selected core from the 1 state to the 0 state, positive signals can be applied coincidently to the bases of the transistor drivers which are the complement of those previously selected, namely, drivers 56*b*, 57*b*, 58*b*, 59*b*, 60*b*, 61*b*, 62*a* and 63*a* causing them to conduct and apply drive current pulses to the column windings 65*b*, 66*a*, 67*b* and 68*a* and the row windings 69*b*, 70*b*, 71*a* and 72*a*. Consequently, in a similar manner as that described for switching the selected core 45 from the 0 state to the 1 state, four units of magnetomotive force in the "0" sense, due to the drive current pulses on the selected column windings, is added to the four units of magnetomotive force in the "0" sense, due to the drive current pulses in the selected row windings, to cause the selected core 45 to switch from the 1 state to the 0 state inducing an output pulse in the output winding 78 which is used as a write drive for the selected winding in the memory and is in the opposite sense to that previously produced. The unselected magnetic cores on the selected column and row receive negligible excitation in the "0" sense while the remaining unselected cores receive zero excitation resulting in no spurious outputs being generated in the output windings of these cores. The magnetic matrix switch of the type shown in FIG. 3 may be expanded in much the same manner as that for the magnetic switch of FIG. 1. Thus, a 2×2 magnetic matrix switch may be expanded to a 4×4 magnetic matrix switch which, in turn, may be expanded to an 8×8 magnetic matrix switch, etc. Thus, a novel magnetic matrix switch is provided wherein the power which is normally required from a single driver may be shared by a group of smaller drivers without introducing any additional spurious outputs than are produced by the conventional magnetic matrix switch. The low power required from each driver allows the use of fast low power transistors to obtain fast high powered pulses for memory driving.

While the magnetic switches in FIGS. 1 and 3 have been illustrated with input coupling units each having two unipolar drivers connected to the winding pairs, it is equally as feasible to use input coupling units each having a bipolar driver connected to one winding of each pair, in which case, the complement winding may be eliminated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A noiseless load sharing magnetic switch having exactly M magnetic elements, output means coupled to said magnetic elements, and N input coupling units, each input coupling unit including drive means and connected windings coupled to each of said magnetic elements in accordance with a predetermined combinatorial code, said N input coupling units being operable to supply currents for said magnetic elements selectively according to a chosen one of a group of individual selection current patterns, one selection current pattern being related to each of said M magnetic elements, characterized by— the physical configuration of said N input coupling units consisting of, for each selection current pattern of said group of individual selection current patterns, a switching portion affecting only the individual magnetic element uniquely related to that selection current pattern, and a noiseless portion affecting each of the remaining $M-1$ magnetic elements of the switch, said switching portion including couplings to only said single magnetic element in such sense that, for the currents produced by said N input coupling units for the related selection pattern, the magnetic effects of the currents and to produce full excitation of said single magnetic element, and said noiseless portion including couplings to each of the remainder $M-1$ of said magnetic elements of the switch in such numbers of each sense that, for the currents produced by said N input coupling units for the related selection current pattern, the magnetic effects of the currents add algebraically to produce a zero net magnetic effect, at each of said $M-1$ remaining magnetic elements.

2. A magnetic switch according to claim 1 wherein each input coupling unit is a symmetrical pair of unipolar drivers and windings traversing each of said M magnetic elements in opposite sense in accordance with the predetermined combinatorial code.

3. A magnetic switch according to claim 1 wherein each input coupling unit is a bipolar driver and a single winding traversing each of said M magnetic elements in accordance with the predetermined combinatorial code.

4. A magnetic switch according to claim 1, wherein said noiseless portion of said physical configuration of said N input coupling units includes equal numbers of couplings of each sense.

5. A magnetic switch according to claim 1 wherein said input coupling units are sequentially conditioned in a first selection current pattern and a complementary second selection current pattern to provide for said single magnetic element first currents to produce full excitation in a first sense and second currents to produce full excitation in a second sense, whereby said single magnetic element provides a first output in a first sense and a second output in an opposite second sense, and wherein said noiseless portion is sequentially conditioned to provide to each of the remainder $M-1$ of said magnetic elements first currents in equal numbers of each sense and second currents which are complementary to the first currents, whereby for the currents produced by said N input coupling units for the related first selection current pattern and complementary second selection current pattern, the magnetic effects of the currents add algebraically to produce a net magnetic effect at each of said remaining $M-1$ magnetic elements of zero.

6. A magnetic switch according to claim 1 wherein M is doubled and N is doubled, the switch therefore having exactly 2M magnetic elements and 2N input coupling units coupled to said 2M magnetic elements in accordance with a selected pattern, developed from a basic two output selection pattern 1 1
1 0 where a row corresponds to a single element and a column corresponds to a pair of windings with a 1 representing the pair coupled to said elements in a first and second sense and a 0 representing the pair coupled to said element in a second and first sense, the basic two output selection pattern being expanded in powers of two so that a 2M output selection pattern consists of

| | |
|---|---|
| N output pattern | N Output pattern |
| N output pattern | complement of N output pattern |

an N output selection pattern repeated in quadrants I, II and III and complemented in quadrant IV, 2M output windings each coupled to a different one of said 2M elements, and means for applying current coincidently to the winding in each of said pairs of windings which is coupled to one of said elements in said first sense to produce excitation of said one element in said first sense inducing a first output signal in the output winding associated therewith, the selected windings being coupled to the remaining $2M-1$ elements in complementary sense to produce no excitation thereof.

7. A magnetic switch according to claim 6 including means for applying current coincidently to the other winding in each of said pairs of windings which is coupled to said one element in said second sense inducing a second output signal in said output winding equal in magnitude but opposite in polarity to that of said first signal, the selected windings being coupled to the remaining $2M-1$ elements in complementary sense to produce no excitation thereof.

References Cited in the file of this patent

UNITED STATES PATENTS 2,691,152 Stuart-Williams ---------- Oct. 5, 1954
2,691,154 Rajchman -------------- Oct. 5, 1954
2,734,182 Rajchman -------------- Feb. 7, 1956
2,768,367 Rajchman -------------- Oct. 23, 1956
2,840,801 Beter ------------------ June 24, 1958
2,912,679 Bonorden -------------- Nov. 10, 1959